UNITED STATES PATENT OFFICE.

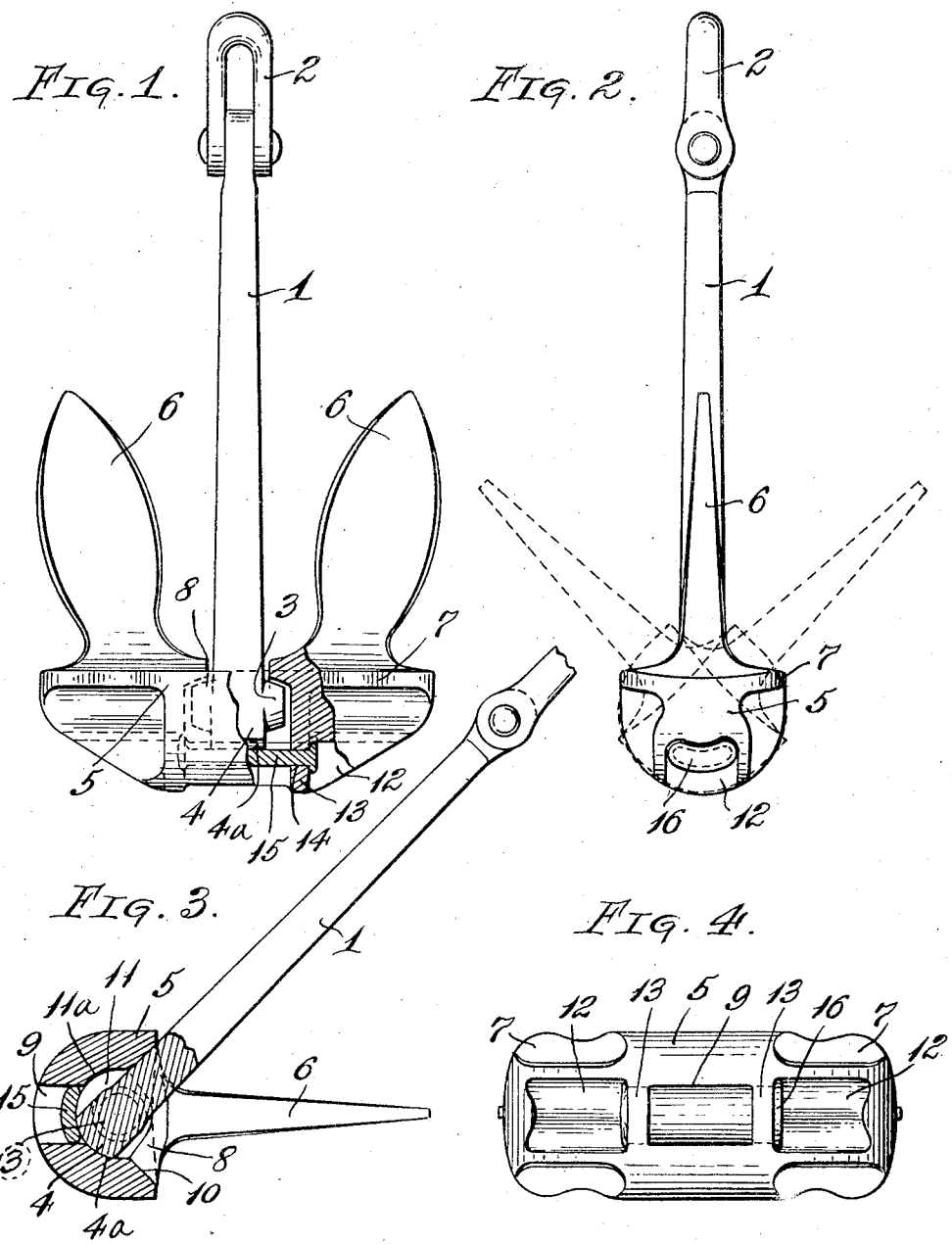

OLIVER W. UPSON, OF EUCLID, OHIO.

ANCHOR.

1,329,563.  Specification of Letters Patent.  Patented Feb. 3, 1920.

Application filed November 27, 1916. Serial No. 133,742.

*To all whom it may concern:*

Be it known that I, OLIVER W. UPSON, citizen of the United States, residing at Euclid, in the county of Cuyahoga and State of Ohio, have invented certain new and useful Improvements in Anchors, of which the following is a specification.

This invention relates to anchors, and particularly to that class of such devices called stockless anchors.

It has been customary in the art to construct stockless anchors with the head made up of a solid piece hinged to the shank by passing the shank with its trunnions through an opening in the head and with the trunnions engaging suitable bearings in the head, and further to close the opening through which the shank is passed by a pin or block forming a bearing for the shank, this block being held in place by a pin or in any other suitable manner. In this type of anchor, the weight of the shank drops upon the bearing block in all positions when the anchor head hits the bottom with the result, in some instances, that the block securing means or pin is sheared and the block is lost.

In the present instance the above mentioned difficulty is overcome by providing a shank holding pin of a construction such that it will form a seat or thrust bearing for the rounded end of an extension of the shank and also forms a continuation of thrust bearing portions arranged in the head itself, so that when the anchor is cast the weight of the shank is thrust against the solid head and only a portion of the pin when the head reaches the bottom thus preventing any tendency toward shearing of the pin.

The invention may be further briefly summarized as consisting in the construction and combination of parts hereinafter set forth in the following drawings, description and claims.

Referring to the drawings, Figure 1 is a side elevation of an anchor constructed according to my invention with a portion of the head broken away; Fig. 2 is a side view; Fig. 3 is a sectional view looking in the same direction as in Fig. 2 with a portion of the shank in elevation; and Fig. 4 is a bottom plan view of the head.

In the arrangement shown in the drawings 1 represents the anchor shank pivotally connected to a suitable shackle 2. The lower end of the shank is provided with laterally extending trunnions 3 and a thrust end extension 4 having a rounded end face $4^a$ on a center concentric with the center of the trunnions.

The head 5 of the anchor is preferably of one piece and is provided with upwardly extending flukes 6, laterally extending webs 7, a slot or opening 8 through the upper part for the shank 1, and an enlarged pocket 9 of substantially the width of the shank and in length slightly greater than the dimension through the trunnions on the shank so that the trunnions will pass freely up into the head and into this pocket 9. The slot 8 is provided with inclined end walls 10 forming limiting shoulders for the head in its swinging movement about the shank and within said slot the pocket or cavity 9 is provided with trunnion bearing portions by which the head is supported on the shank, as shown in Fig. 1. In addition to the slot or opening 8 and the pocket 9 there is a partially cylindrical cavity 11 formed concentric with the center of the trunnions thereby forming bearing surfaces $11^a$ in the head on both sides of the center for the curved end face of the end extension 4 of the shank as is clearly shown in Fig. 3.

The lower portion of the head 5 is provided with laterally extending recesses 12 in alinement with the elongated socket 9 but separated therefrom by walls 13. These walls are provided with bean shaped openings 14 adapted to receive a pin 15 of a corresponding shape and having a head 16. When this pin is in place the unheaded end is riveted over to secure the pin in place or the pin may be held in any other suitable manner. The shape of the pin is important in that it presents a concave longitudinal upper side located in such a way that it forms a continuation of the sides of opening 11 completing the thrust bearing surface for the arc shaped end extension of the shank.

It will be seen from the foregoing that when the anchor is descending the shank will be in substantially a vertical position and the flukes and head will assume a position to one side thereof by reason of their weight and when the head is engaged or when it reaches the bottom the weight of the shank will thrust against the curved bearing surface of the head formed by the opening 11 and against only a portion of the pin thereby relieving the pin of the greater part of the impact transmitted by the shank.

What I claim is:—

1. In a stockless anchor, a one piece head having an opening therethrough for the shank, trunnion bearing portions formed in said head within said opening, arc shaped thrust bearing portions formed in said head on either side of the shank receiving opening, a shank, trunnions extending from said shank and adapted to engage the trunnion bearing portions of the head, a thrust bearing portion extending beyond said trunnions and adapted to engage the arc shaped thrust bearing portions of the head when the shank is out of alinement with the opening in the head, and means for preventing the displacement of the shank with respect to the head when the head opening is in alinement with the shank.

2. In a stockless anchor, a one piece head having an opening therethrough for the shank and a pin receiving opening intersecting said shank opening, trunnion bearing portions formed in said head within said opening, arc shaped thrust bearing portions formed in said head on either side of the shank receiving opening, a shank, trunnions extending from said shank and adapted to engage the trunnion bearing portions of the head, a thrust bearing extension carried by the shank and projecting beyond said trunnions and adapted to engage the arc shaped thrust bearing portions of the head when the shank is out of alinement with the opening in the head, and a pin insertible endwise into said pin receiving opening for preventing the displacement of the shank with respect to the head when the head opening is in alinement with the shank and having its inner surface a continuation of the thrust bearing portions of the head.

3. In a stockless anchor, a one piece head having a shank opening extending through the head and provided with curved trunnion bearings within said opening and a pin opening within the outer surface of the head and intersecting the shank opening, a shank extending into said opening and having trunnions engaging the curved trunnion bearings within the opening of the head and also having an arc shaped end, the curvature of said arc being concentric with the trunnions of the shank, and a pin in said pin opening for preventing the escape of said shank through the outer end of the head, said pin having a concave surface conforming to the arc shaped end of the shank and providing a bearing therefor.

4. In a stockless anchor, a one piece head having a shank opening extending through the head and provided with curved trunnion bearings within said opening and a bean shaped pin opening within the outer surface of the head and intersecting the shank opening, a shank extending into said opening and having trunnions engaging the curved trunnion bearing within the opening of the head and also having an arc shaped end, the curvature of said arc being concentric with the trunnions of the shank, and a straight pin which is bean shaped in cross section located in said pin opening for preventing the escape of said shank through the outer end of the head, the concave surface of said bean shaped pin conforming to the arc shaped end of the shank and providing a bearing therefor.

In testimony whereof I affix my signature.

OLIVER W. UPSON.